Oct. 8, 1935.   W. S. SEARLES   2,016,685
OXFORD EYEGLASSES
Filed Jan. 18, 1933
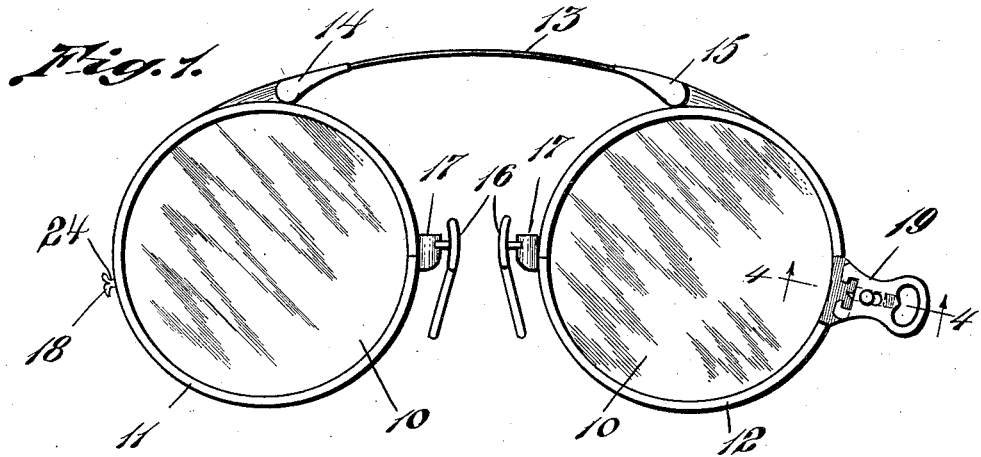
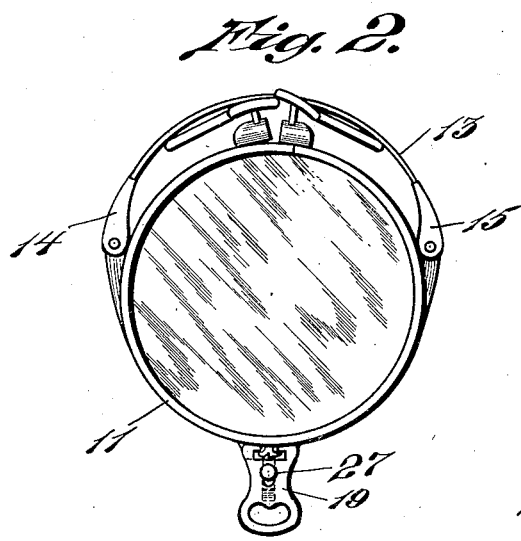
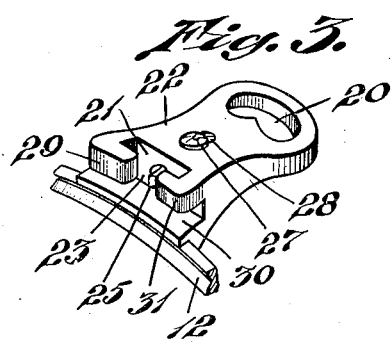
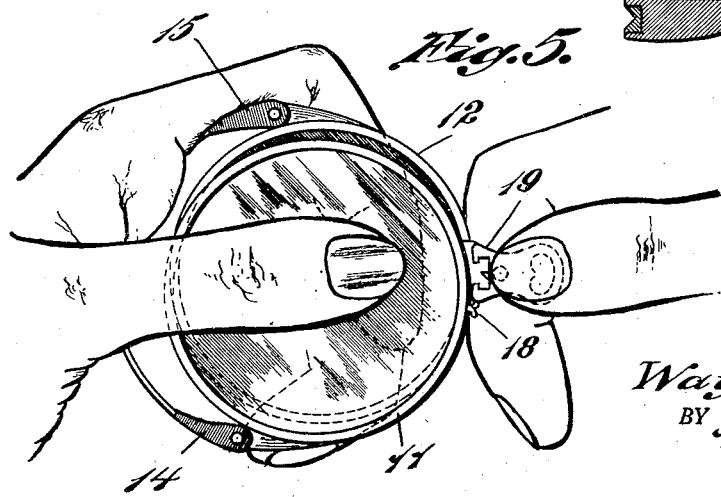
INVENTOR.
Wayne S. Searles
BY Barlow & Barlow
ATTORNEYS.

Patented Oct. 8, 1935

2,016,685

UNITED STATES PATENT OFFICE 2,016,685

OXFORD EYEGLASSES

Wayne S. Searles, Providence, R. I., assignor to Universal Optical Corporation, a corporation of Rhode Island Application January 18, 1933, Serial No. 652,310

7 Claims. (Cl. 88—44)

This invention relates to an ophthalmic mounting, more particularly an Oxford, and has for one of its objects the provision of retaining means for holding the lenses in folded position, one over the other, which retaining means will be easy of access and of such construction that the previously uninformed person using the same may readily observe the manner in which it operates.

Another object of the invention is the provision of a retaining means which will permit a discharge from it of one of the lens rims in a plane in which the rim is actuated by the resilient bridge and yet permit movement of the lens rim into its retaining position from a direction different from that of its discharge movement.

Another object of the invention is the provision of a retaining means which, when held in the hand, will readily release the lens from folded position upon manual operation.

Another object of the invention is the provision of a latch which may be so protected that it will not become easily bent or so distorted as to prevent its proper operation.

With these and other objects in view, the invention consists of certain novel features of construction, as will be more fully described, and particularly pointed out in the appended claims.

In the accompanying drawing:

Fig. 1 is a face view of a pair of lenses in their unfolded position connected together by a spring bridge of a so-called Oxford-type.

Fig. 2 is a plan view of the lenses in folded position.

Fig. 3 is a perspective view of the retaining means for holding the lenses in folded position.

Fig. 4 is a sectional view on line 4—4 of the Figure 1.

Fig. 5 is a plan view showing the device as held in the hands from which position a release of the lenses will occur, notwithstanding the same being gripped as therein shown.

In the type of ophthalmic mounting generally known as an Oxford the spring bridge which connects the lenses together serves the double purpose of causing the lenses to move toward the nose that they may be mounted on the face of the wearer, and also is sufficiently resilient to permit the lenses to be moved one upon the other to folded position with the resilient bridge under a sufficient tension to swing the lenses, each in the plane in which it lies outwardly to open or unfolded position and a retaining means or catch for accomplishing this result holds these lenses against the tendency of the resilient bridge to unfold them.

Catches of this character are engaged when the lenses are moved to folded position, sometimes being by reason of a movement in the plane of the lens rim engaged, and at other times by moving the lenses at right angles to the plane of the lens. It being usual to discharge the lens from this retaining means in the reverse manner from that in which it is positioned in engagement with retaining means. This arrangement entails the objection either of the discharge being prevented by reason of the person holding the same in the customary manner such as illustrated in Figure 5, or has the objection that the person endeavoring to operate the same does not observe the manner of causing the retaining device to operate and must be especially instructed which is objectionable in the trade, and in order to avoid these objections and disadvantageous features I provide a retaining means having a notch or recess opening outwardly which may be readily observed and which indicates the position into which the retaining catch may fit. While there is a slot provided substantially in the plane of one of the lens rims which permits discharge in a different direction so that upon release of the catch notwithstanding the thumb and finger being pressed on the outer opposite sides of the device, when in the folded position, the device may release from the retaining means to spring to unfolded position as desired and the following is a detailed description of the present embodiment of this invention illustrating the preferred means by which these advantageous results may be accomplished.

With reference to the drawing 10 designates the lenses which are mounted in the lens rims 11 and 12. These lens rims are connected together by a resilient bridge 13 spanning the portion between the knuckles 14 and 15 which are rigidly mounted upon the lens rims 11 and 12, nose guards 16 are provided at the inner edge of the lenses secured thereon by barrel members 17.

The resilient bridge 13 serves the purpose of tending to spring the rims toward each other that the nose guards 16 may grip the nose and hold the mounting in position on the face of the wearer and is also of sufficient resiliency to permit the lenses to be folded one upon the other to the position illustrated in Figure 2. The lenses are held in this folded position by a catch 18 mounted upon the rim 11 and a retaining device 19 mounted upon the rim 12.

The retaining device 19 is formed as illustrated in Figure 3, with an opening 20 for a ribbon or other convenient support and is recessed as at 21 vertically from its top face 22, in the general form of a letter T opening as at 23 to receive the shank portion 24 of the catch 18. The catch 18 is generally T shaped to fit within this corresponding recess 21—23 in which position it lodges back of the slidable bolt 25 which is forced outwardly by spring 26 and which has a finger piece 27 extending through slot 28 for manipulation thereof.

The recess 21 is closed on one side 29 but is provided with an undercut portion 30 beneath the overhanging part 31 which undercut provides a groove or opening through which the catch may move to release it from the retaining means when the bolt 25 is withdrawn by manipulation in the finger piece 27. It being understood that the resiliency of the bridge 13 tends to move lens 11 in the plane in which it lies in folded position and thus move the catch 18 through the slot 30, it being held in position against this tendency only by reason of the pressure exerted upon the bolt 25, there being no tendency for the lens 11 to lift after once there positioned.

The above arrangement is such that as the lenses are moved to the completion of their closed position the catch 18 may be dropped into the T slot back of the bolt 25 and there held by reason of the tension of the spring 13 against the bolt and when the bolt is withdrawn and the spring of the bridge 13 is permitted to act, the catch will move from this retaining position through the slot 30 notwithstanding the ordinary pressure exerted for holding the device in the hands such as illustrated in Figure 5. This holding in the hand it being understood would prevent the upward discharge of the catch through the slot 21 which it entered.

In some cases it may be desirable to position the catch by sliding it thru slot 30 which may be accomplished by reason of the tapered surface on the latch bolt for forcing the same back by pressure there against until the catch moves past it after which it snaps out into position to hold the catch.

Thus the advantage of positioning the device in position is obtained and the advantages of releasing the device are obtained with the desired advantages of either heretofore previous construction above mentioned.

The aforegoing description is directed solely towards the construction illustrated, but I desire it to be understood that I reserve the privilege of resorting to all the mechanical changes to which the device is susceptible, the invention being defined and limited only by the terms of the appended claims.

I claim:

1. Eyeglasses comprising a pair of lenses, rims for the lenses, a resilient bridge connecting said rims, a catch on one rim, and retaining means on the other rim provided with means for receiving the catch either at right angles or in a plane parallel to the plane of one of the lenses and releasing the same in a plane parallel to the plane of one of the lenses, said retaining means comprising a body having guiding surfaces to direct the catch into desired position.

2. Eyeglasses comprising a pair of lenses, rims for the lenses, a resilient bridge connecting said rims, a catch on one rim, retaining means on the other rim provided with two interconnecting channels, one at right angles to the plane of the lenses, of a size to accommodate movement of said catch therethrough, and a latch bolt in one of said channels to control movement of the latch therein.

3. Eyeglasses comprising a pair of lenses, rims for the lenses, a resilient bridge connecting said rims, a catch on one rim, retaining means on the other rim provided with interconnecting channels in planes at right angles to each other of a size to accommodate movement of said catch therethrough, one of said channels being located in a plane parallel to the lenses, and a latch bolt in said last channel to prevent movement of the catch from said channel until said bolt is withdrawn.

4. Eyeglasses comprising a pair of lenses, rims for the lenses, a resilient bridge connecting said rims, a catch on one rim, retaining means on the other rim provided with interconnecting channels at right angles to each other of a size to accommodate movement of said catch therethrough, one of said channels being located in a plane parallel to the lenses, and a latch bolt in said last channel to prevent movement of the catch from said channel until said bolt is withdrawn, said other channel at right angles thereto and connecting therewith being located at one side of said bolt to permit said catch to be positioned in front of the bolt without moving the same.

5. Eyeglasses comprising a pair of lenses, rims for the lenses, a resilient bridge connecting said rims, a catch on one rim, and a latch on the other rim, said latch comprising a body having a recess to receive and guide said catch by a movement at right angles to the plane of said lenses, and a channel for releasing said catch in a plane parallel to the plane of said lenses.

6. Eyeglasses comprising a pair of lenses, rims for the lenses, a resilient bridge connecting said rims, said rims being foldable one over the other with the bridge under tension tending to unfold them, a catch on one rim, a latch on the other rim, comprising a body having a groove therein in the direction of a plane parallel to the plane of said rim which carries the latch for receiving said catch, a latch bolt protruding from said body to engage said catch to retain it in said groove against the exertion of said spring bridge tending to move it out of the groove, and means for positioning said catch in front of said latch bolt and in position to be held thereby without movement of said bolt.

7. Eyeglasses comprising a pair of lenses, rims for the lenses, a resilient bridge connecting said rims, said rims being foldable one over the other with the bridge under tension tending to unfold them, a catch on one rim, a latch on the other rim comprising a body having a groove therein in the direction of a plane parallel to the plane of said rim which carries the latch for receiving said catch, a latch bolt protruding from said body to engage said catch to retain it in said groove against the exertion of said spring bridge tending to move it out of the groove, and means for positioning said catch in front of said latch bolt and in position to be held thereby without movement of said bolt, said means comprising an opening thru the upper wall of said groove thru which the catch may be passed into the groove by movement at right angles to the plane of the lens.

WAYNE S. SEARLES.